United States Patent
Sloate et al.

(10) Patent No.: US 8,834,273 B2
(45) Date of Patent: Sep. 16, 2014

(54) MULTIPLEXED SECURE VIDEO GAME PLAY DISTRIBUTION

(75) Inventors: Jim A. Sloate, Duvall, WA (US); Scott Elliott, Federal Way, WA (US); Hiroshi Kamadat, Redmond, WA (US); Kelly Lindseth, Seattle, WA (US); Patrick Link, Carnation, WA (US); David McCarten, Bothell, WA (US)

(73) Assignee: Nintendo Co., Ltd., Kyoto (JP)

( * ) Notice: Subject to any disclaimer, the term of this patent is extended or adjusted under 35 U.S.C. 154(b) by 1310 days.

(21) Appl. No.: 11/882,816

(22) Filed: Aug. 6, 2007

(65) Prior Publication Data

US 2007/0275780 A1  Nov. 29, 2007

Related U.S. Application Data

(62) Division of application No. 10/293,943, filed on Nov. 14, 2002, now Pat. No. 7,878,908.

(51) Int. Cl.
*A63F 13/12* (2006.01)

(52) U.S. Cl.
USPC ........... 463/42; 463/1; 463/9; 463/29; 463/30

(58) Field of Classification Search
USPC ............................................. 463/40–42, 1–6
See application file for complete search history.

(56) References Cited

U.S. PATENT DOCUMENTS

| | | | |
|---|---|---|---|
| 4,247,106 A | 1/1981 | Jeffers et al. | |
| 4,517,656 A | 5/1985 | Solimeno et al. | |
| 4,572,509 A | 2/1986 | Sitrick | |
| 5,051,822 A | 9/1991 | Rhoades | |
| 5,319,705 A | 6/1994 | Halter et al. | |
| 5,396,546 A | 3/1995 | Remillard | |
| 5,497,479 A | 3/1996 | Hornbuckle | |
| 5,544,313 A | 8/1996 | Shachnai et al. | |
| 5,558,339 A | 9/1996 | Perlman | |
| 5,577,180 A * | 11/1996 | Reed .............................. | 345/634 |
| 5,577,735 A | 11/1996 | Reed et al. | |
| 5,581,270 A | 12/1996 | Smith et al. | |
| 5,581,740 A | 12/1996 | Jones | |
| 5,632,681 A | 5/1997 | Bakoglu et al. | |
| 5,641,319 A | 6/1997 | Stoel et al. | |
| 5,654,746 A | 8/1997 | McMullan, Jr. et al. | |
| 5,664,778 A | 9/1997 | Kikuchi et al. | |

(Continued)

OTHER PUBLICATIONS

Bangun et al "A Network Architecture for Multiuser Games on Demand", ICICS, Sep. 1997.*

(Continued)

*Primary Examiner* — Ronald Laneau
*Assistant Examiner* — Ross Williams
(74) *Attorney, Agent, or Firm* — Nixon & Vanderhye P.C.

(57) ABSTRACT

Multiple video game players access an encrypted video game library stored on a shared mass storage device. A multiplexer multiplexes data read from the mass storage device to provide output streams to multiple video game playing units consuming video game instructions. A secure bus communicates video game instructions from the shared mass storage device to each of the video game playing units. Video game software or other entertainment content is distributed to the shared mass storage device via electronic download in multi-level encrypted form. Before being transported, the content is encrypted and then further encrypted. Once the content has been successfully transported, it is decrypted to remove the further encryption layer—leaving the first encryption layer intact for protecting the video game during storage on mass storage at the remote distribution location.

38 Claims, 9 Drawing Sheets

Example Secure Distribution

Example Interface Logic

(56) References Cited

U.S. PATENT DOCUMENTS

| | | |
|---|---|---|
| 5,712,976 A | 1/1998 | Falcon et al. |
| 5,740,251 A | 4/1998 | Tajima et al. |
| 5,787,259 A | 7/1998 | Haroun et al. |
| 5,790,201 A | 8/1998 | Antos |
| 5,809,564 A | 9/1998 | Craze et al. |
| 5,819,156 A | 10/1998 | Belmont |
| 5,835,589 A | 11/1998 | Nakashima |
| 5,905,942 A | 5/1999 | Stoel et al. |
| 5,907,715 A | 5/1999 | Stoel et al. |
| 5,917,725 A | 6/1999 | Thacher et al. |
| 5,923,306 A | 7/1999 | Smith et al. |
| 5,929,941 A | 7/1999 | Tsuchiya et al. |
| 5,935,004 A | 8/1999 | Tarr et al. |
| 5,936,679 A | 8/1999 | Kasahara et al. |
| 5,959,596 A | 9/1999 | McCarten et al. |
| 6,005,561 A | 12/1999 | Hawkins |
| 6,022,274 A | 2/2000 | Takeda et al. |
| 6,029,046 A | 2/2000 | Khan et al. |
| 6,042,476 A | 3/2000 | Ohashi et al. |
| 6,047,127 A | 4/2000 | McCarten et al. |
| 6,061,656 A | 5/2000 | Pace |
| 6,128,660 A | 10/2000 | Grimm et al. |
| 6,134,590 A | 10/2000 | Perlman |
| 6,135,887 A | 10/2000 | Pease et al. |
| 6,147,663 A | 11/2000 | Smith et al. |
| 6,147,696 A | 11/2000 | Smith et al. |
| 6,154,186 A | 11/2000 | Smith et al. |
| 6,205,582 B1 | 3/2001 | Hoarty et al. |
| 6,226,385 B1 | 5/2001 | Taguchi et al. |
| 6,238,290 B1 | 5/2001 | Tarr et al. |
| 6,238,291 B1 | 5/2001 | Fujimoto et al. |
| 6,263,435 B1 | 7/2001 | Dondeti et al. |
| 6,305,020 B1 | 10/2001 | Hoarty et al. |
| 6,363,148 B1 | 3/2002 | Sako |
| 6,379,252 B2 | 4/2002 | Takata et al. |
| 6,468,160 B2 | 10/2002 | Eliott |
| 6,488,585 B1 | 12/2002 | Wells et al. |
| 6,496,981 B1 | 12/2002 | Wistendahl et al. |
| 6,500,070 B1 | 12/2002 | Tomizawa et al. |
| 6,557,030 B1 | 4/2003 | Hoang |
| 6,579,184 B1 * | 6/2003 | Tanskanen ............... 463/41 |
| 6,599,194 B1 | 7/2003 | Smith et al. |
| 6,672,963 B1 | 1/2004 | Link |
| 6,690,726 B1 | 2/2004 | Yavits et al. |
| 6,716,102 B2 | 4/2004 | Whitten |
| 6,762,733 B2 | 7/2004 | Smith |
| 6,769,989 B2 | 8/2004 | Smith |
| 6,810,528 B1 | 10/2004 | Chatani |
| 6,884,171 B2 | 4/2005 | Eck |
| 2001/0044339 A1 * | 11/2001 | Cordero et al. ............ 463/42 |
| 2002/0054016 A1 | 5/2002 | Smith et al. |
| 2002/0116284 A1 | 8/2002 | Stelman et al. |
| 2002/0128029 A1 | 9/2002 | Nishikawa et al. |
| 2002/0133707 A1 * | 9/2002 | Newcombe ............ 713/183 |
| 2002/0142834 A1 | 10/2002 | Sobue |
| 2003/0037123 A1 * | 2/2003 | Hoang ................ 709/219 |
| 2003/0171149 A1 | 9/2003 | Rothschild |
| 2005/0208636 A1 | 9/2005 | Wahlbom et al. |

OTHER PUBLICATIONS

U.S. Appl. No. 10/293,943, filed Nov. 14, 2002; Inventor: Sloate et al.
Office Action mailed Jul. 26, 2006 in co-pending U.S. Appl. No. 10/293,143.
Office Action mailed Oct. 9, 2007 in co-pending U.S. Appl. No. 10/293,143.
Office Action mailed Aug. 15, 2008 in co-pending U.S. Appl. No. 10/293,143.
Office Action mailed Jul. 20, 2009 in co-pending U.S. Appl. No. 10/293,143.

* cited by examiner

Example Video Game Distribution Network

Example Secure Distribution

Example User Distribution Network 60

Example Game Engine Assignment

Example Controller Serial Data Packet

Example Interactive Video Game Server Data Paths

Example Interface/Multiplexer Logic

Example Interface Logic

Example Buffer Logic

MULTIPLEXED SECURE VIDEO GAME PLAY DISTRIBUTION

CROSS-REFERENCES TO RELATED PATENT APPLICATIONS

This application is a divisional of U.S. application Ser. No. 10/293,943, filed on Nov. 13, 2002, now U.S. Pat. No. 7,878,908.

This application is related to the following copending commonly-assigned patent applications:
Ser. No. 09/954,436 filed Sep. 18, 2001 of Eck et al. entitled Video Game Distribution Network";
Ser. No. 09/723,322 filed Jan. 28, 2000 of Link entitled "Software Implementation Of A Handheld Video Game Hardware Platform" now U.S. Pat. No. 6,672,973; and
Ser. No. 09/931,743 filed Aug. 20, 2001 of Smith et al entitled "Hotel-Based Video Game And Communication System".

FIELD OF THE INVENTION

The invention relates to video game playing systems, and more particularly, to distribution networks for providing video game play to multiple users. Still more particularly, the invention relates to systems and methods for providing video game play to plural remote users on demand within a distributed network such as, for example, on a hotel, cruise ship, airplane or the like.

BACKGROUND AND SUMMARY OF THE INVENTION

Traditionally, video games have mostly been played on hardware that is local to the video game user. Users usually go visit a video game arcade to play arcade video games, and home video game users typically purchase a home video game system such as the Nintendo Gamecube System or a home computer to play video games at home. To play a game at home, the user usually selects a video game on a optical disk or other storage device (or in the case of a personal computer or other system, he or she may download the game from the Internet or other network) and controls the local hardware to begin executing the game. The game is displayed on the user's home television set or computer display.

There may be situations in which it is desirable to distribute video game play to remote users in more controlled settings.

For example, as the opportunity for leisure family travel has increased throughout the general population, the travel industry has adapted by providing travel facilities with many of the comforts of home. Many hotels now have amenities for younger travelers to make a family's stay more pleasant and convenient. Similarly, airlines now routinely show movies, videos and other multi media during flights to entertain younger passengers and help them pass the time. Cruise lines generally attempt to provide luxury accommodations including all of the comforts of home for travelers of all ages.

Playing video games can often be an excellent way to pass the time while waiting to travel or during travel. An airplane or train ride may seem to pass more quickly if one is able to spend the time playing a challenging, fun interactive video game. Similarly, the idea of taking young children to a hotel or on a cruise ship may be daunting unless one has a way to entertain the children and keep them from becoming bored. The ability to play video games in hotel rooms and cruise ship cabins is a significant benefit to parents and other caregivers who wish to entertain children and keep them busy and occupied.

To meet these needs, systems were developed in the past for distributing video game play among a number of users in a hotel, train, airplane, cruise ship or other context. It has been possible in the past for an airline passenger to play video games on a so-called "seat back controller"—basically a miniature personal computer installed within the back of the airplane seat in front of you. Also, it has long been possible through a television distribution system commercialized by Lodgenet to play Nintendo video games in a hotel room using a standard television set and hand held controllers. Briefly, this prior art television distribution system can distribute video game play audio and video to individual hotel rooms on demand. A "back channel" used to request movies and other services on demand is also used to send interactive video game input commands such as joystick control (e.g., switch closure) data from hotel rooms to a centralized video game playing server. This centralized video server—which in one commercial implementation comprises an array of video game players having their video/audio outputs directed to different television channels within the television distribution system—is shared to provide video game play for a plurality of users in different hotel rooms simultaneously.

Centralizing the video game playing hardware and sharing it among multiple remote users saves costs and solves other problems as well. For example, sharing centralized hardware among many hotel guests makes it possible to eliminate the expense of placing a video game player in each room where it might be stolen or damaged. Generally, a relatively small percentage of the total number of guests of a hotel will wish to play video games at any given time. A limited number of video game hardware units at a central location within the hotel can be used to provide video game playing services to the entire hotel.

Using such a system to play a video game, a user in a hotel room operates the television set remote control to request video game play. Assuming a video game unit at the central location is available for use, a data connection is established between the hand-held remote controller in the hotel room and the control inputs of an assigned available video game player at the central location. The assigned video game player output is routed to the particular hotel room's television set using conventional television signal distribution techniques (e.g., over a particular television channel assigned for that particular video game playing session). A computer used to establish these connections may also be responsible for billing the room's occupant based for example on the amount of time of video game play, number or identify of games played, etc. The user may request different games by operating his television remote control which causes the computer to load the selected game into the assigned video game player. For additional information about such arrangements, see for example U.S. Pat. Nos. 6,154,186; 6,147,696; 6,147,663; 6,047,127; 5,959,596; 5,923,306; 5,581,270; and US Patent Publication No. 20020054016.

While the technology described above has been successful in allowing airline and train passengers, hotel room guests and the like to play video games, further improvements are possible and desirable.

One area of desired improvement relates to the secure maintenance of updated remote video game libraries to be shared among hotel room guests, airline passengers, etc. As with most forms of entertainment, it is the quality and interest factor of video games that make people want to play them. A hotel operator who has made a substantial investment to provide video game play from hotel rooms may not see a significant return on his or her investment if guests can play only a limited selection of games. On the other hand, if the latest, most exciting video games are being offered (e.g., including newer games that guests have not yet purchased at home), then many more people will want to play.

With the recent increases in the speed and bandwidth of digital connections, it is now possible to electronically download video games and other digital content via satellite or other high speed networks. For example, "feeds" can be used to remotely update video game libraries with the latest video games. Unfortunately, however, such electronic downloading raises the risk of piracy of the content. Hackers eavesdropping on satellite feeds may be able to receive the video game content and disseminate it without authorization. Intruders having access to the hotel's centralized distribution system (e.g., hotel guests, clerks, cleaning staff, etc.) similarly may be able to purloin content by copying the downloaded or otherwise resident video game software from the centralized facility onto portable storage media that they might then take home with them—or the central facilities' mass storage devices may themselves be stolen. These significant security risks present a challenge to those trying to maintain shared video game electronic libraries at a number of insecure remote locations.

Another challenge relates to cost, reliability and size of the centralized video game distribution system. In a successful deployment of remote video game distribution services, there will be many such systems installed in a variety of locations far apart from one another. For example, a major hotel chain adopting video game playing as part of its guest offerings may naturally lead to installing video game distribution systems at a number of hotels all over the country or the world. Once the system is deployed, it is highly desirable for it to operate as reliably and trouble-free as possible without the need for service or maintenance cells. Breakdowns will cause interruption in service, drastically decreasing the desirability and usage of the system. The need to send a service technician out to various distant locations where systems are installed should be reduced as much as possible. Hotels and other locations such as cruise ships, airplanes and trains also may not have much space available for installing a video game distribution system. Therefore, a certain degree of compactness would be desirable.

The present invention solves these and other problems and concerns by providing a reliable secure video game or other entertainment content distribution system.

In accordance with one aspect of a presently preferred illustrative example embodiment, video game software or other entertainment content is distributed via electronic download in multi-level encrypted form. The content is encrypted with a first encryption layer, and is subsequently encrypted with a second encryption layer. The second encryption layer is used to protect the content during electronic download. Once the content has been successfully downloaded, it is decrypted to remove the second encryption layer—leaving a first encryption layer intact for protecting the video game during storage on mass storage devices at the remote distribution location.

Using this technique, the video game content remains encrypted even after arrival and storage to protect it against the risk of an attacker who has access to the remote storage device(s). A higher security level is provided by additional encryption level(s) during electronic download to protect against the risk of eavesdroppers listening in on a satellite or other public communications link. Such secure electronic distribution over a network minimizes the need to transfer physical storage media (e.g., mailing or otherwise transporting hard drives, optical disks, etc.) while providing automatic remote video game library updating and maintenance.

In accordance with another exemplary illustrative aspect of the presently preferred exemplary embodiment of the invention, a plurality of video game players share a video game library stored on a shared mass storage device. A multiplexer multiplexes data read from the mass storage device to provide output streams to multiple video game playing units consuming video game instructions. A secure bus communicates video game instructions from the shared mass storage device to each of the plurality of video game playing units. In one exemplary illustrative embodiment, the multiplexing circuitry resides on a printed circuit board mounted on a modular plug-in mass storage device to provide a modular system allowing field replacement by untrained individuals.

BRIEF DESCRIPTION OF THE DRAWINGS

These and other features and advantages will be better and more completely understood by referring to the following detailed description of presently preferred example embodiments in conjunction with the drawings, of which:

FIG. 5 shows an example illustrative interactive video game server data flow;

DETAILED DESCRIPTION OF EXAMPLE ILLUSTRATIVE EMBODIMENTS

Figure 1:
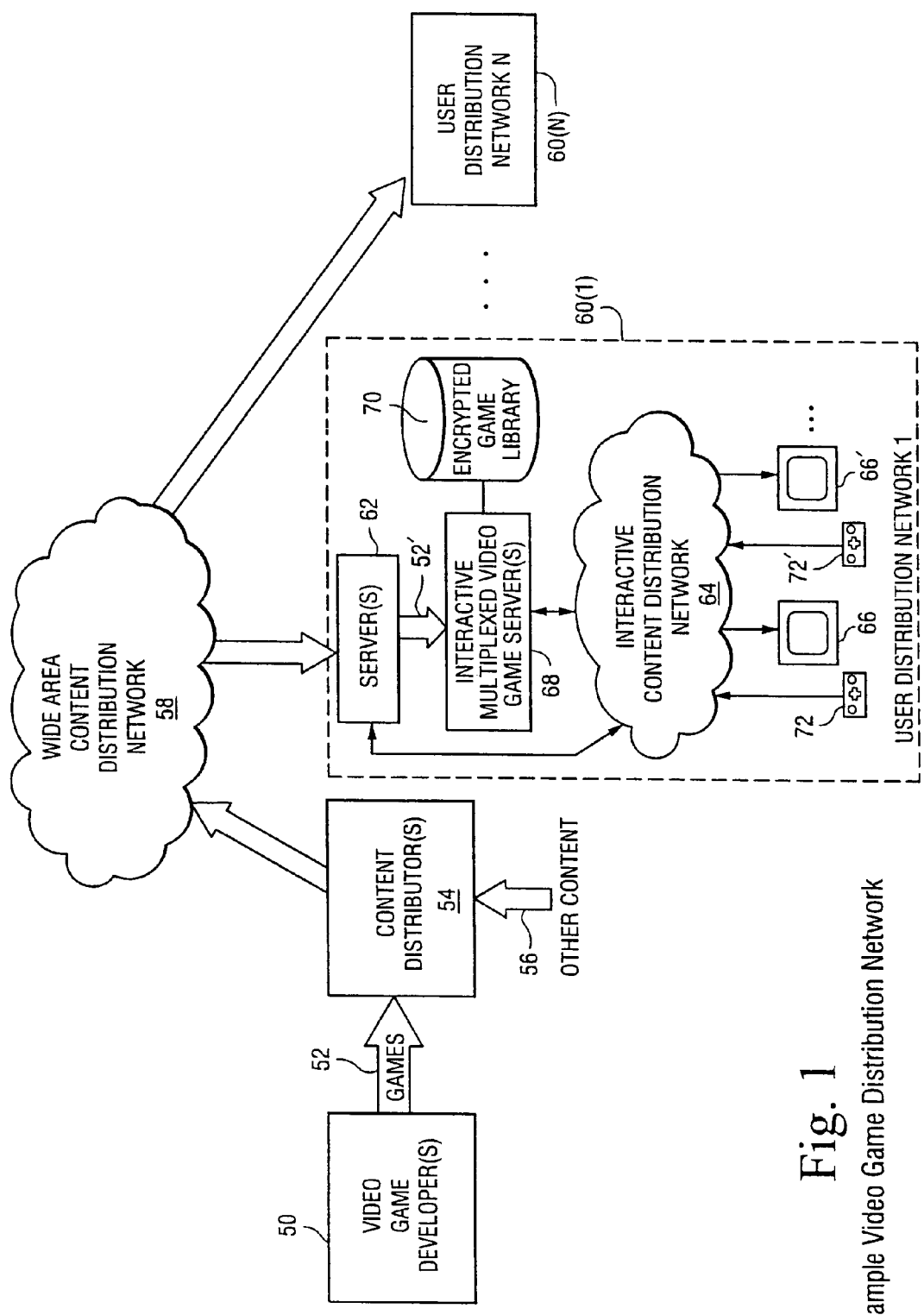
FIG. 1 shows an example illustrative overall video game distribution network.

FIG. 1 shows an example overall video game distribution network. In FIG. 1, one or more video game developer(s) 50 develop video games 52 and provide them to one or more content distributor(s) 54. In some examples, the content distributor(s) 54 may also receive and distribute other content 56 such as, for example, television programming, movies, audio programs and any other content imaginable. For example, content distributor(s) 54 may be in the business of distributing television programming, movies and other mass media via a satellite or other wide area content distribution network 58 to a number of remote locations. While FIG. 1 shows video game developers 50 and content distributors 54 as separate entities, in other arrangements these two roles may be performed by the same business entity.

As shown in FIG. 1, the wide area content distribution network 58 transports video games 52 and other content 54 to a plurality of user distribution networks 60. Wide area content distribution network 58 may include, for example, one or more satellites in geo-synchronous orbit that receive and retransmit streaming television and movie programming. In other examples, wide area content distribution network 58 may include the Internet, telephone lines, portable mass media storage devices such as optical disks, or virtually any other way to move data from one place to another.

In the example shown, user-distribution networks 60 provide a "store and forward" function, i.e., they receive content from the wide area content distribution network 58 and store that content for on-demand use by users. User distribution networks 60 may also provide real time streaming content to users. However, as will be understood from the discussion below, the conventional "store and forward" model is not used for video games in the preferred exemplary embodiment. Rather, in the preferred exemplary illustrative embodiment, video games are actually executed on a user-interactive basis at a "head-end" of the user distribution network and the results of the interactive video game play are then transmitted to end users. In other applications, a more conventional "store and forward" function may alternatively be performed where video game instructions are stored and then forwarded for local execution at end user locations using end user execution hardware.

In one particular illustrative example, user distribution networks 60 may be installed in particular locations remote from the content distributor 54. For example, the user distribution networks 60 may be installed in hotels or resort facilities to provide content to guest rooms. User distribution networks 60 could be installed in cruise ships, airplanes, trains, and other transportation vehicles where passengers have access to a personal video screen and input controls. In still other arrangements, user distribution networks 60 may comprise cable, DSL or other distribution networks. For example, user distribution networks 60 might comprise a cable television head-end that distributes television and other content to monthly or other subscribers. User distribution networks 60 could alternatively comprise two-way interactive satellite or other content distribution networks of any type on the Internet.

As shown in FIG. 1, an exemplary illustrative user distribution network 60(1) includes a content server 62 that receives games 52 and other content 56 transported by wide area content distribution network 58. Content server 62 may provide streaming content to a plurality of users having user appliances 66 such as television sets. In one particular illustrative arrangement, user appliances 66 may comprise conventional home color television sets installed in hotel rooms, cruise ship suites, residences or other places. The user input devices 72 may in one illustrative embodiment comprise separate handheld controller devices of the type conventionally used to play video games, e.g., they may include joysticks, thumb pads, push buttons and/or other conventional controls found on handheld video game controllers. In one exemplary embodiment, there may be no connection between appliances 66 and handheld controllers 72. In other embodiments, the user input devices 72 and appliances 66 may be integrated as a single system such as a personal computer, airline seatback controller or other such arrangement.

In the example shown, content server 62 provides video games 52 it has received via the wide area content distribution network 58 to an interactive multiplexed video game server 68 for storage into an encrypted game library 70. The interactive multiplexed video game server 68 is able to retrieve and at least partially decrypt games from the video game library 70 in response to user demand, and provides streaming interactive video game play to multiple user appliances 66 via the interactive content distribution network 64. Users in turn provide inputs via handheld controllers 72 to interactively control such video game play.

In one exemplary embodiment, there may be an additional user input device (e.g., an interactive remote control device, a telephone, or any other arrangement) for use by users to request video game play. In one example arrangement, the user appliance 66 may include a set top box linked using infrared or other wireless link to the same or further handheld remote control device 72 allowing data entry. In this particular arrangement, the user selects video game play by manipulating the same or different remote control device 72 while watching menu screens displayed on the appliance 66. These remote control inputs are provided to content server 62 via the interactive content distribution network 64 in the exemplary arrangement. The content server 62 may then, in turn, provide control signaling to interactive multiplexed video game server 68 indicating that a particular user at a particular location (e.g., hotel room) has requested a particular video game. The interactive multiplexed video game server 68 may retrieve the selected video game from encrypted game library 70 on user demand, decrypt and execute the video game, and provide the resulting display information to the particular user's appliance 66 via interactive content distribution network 64. User inputs the user provides by operating handheld controller 72 may be routed by the interactive content distribution network 64 to the interactive multiplexed video game server 68 for interactively controlling game play of that particular video game.

In the illustrative multi-user environment shown, interactive multiplexed video game server 68 can provide any number of real time video game execution sessions simultaneously (e.g., up to a predetermined maximum determined by equipment capabilities) to allow multiple remote users to play different (or the same) video games simultaneously. In one example, different remote users can ask to play different video games. The interactive multiplexed video game server 68 will retrieve these different video games from the encrypted game library 70 and execute them on demand for requesting remote users. If two remote users request the same video game, the interactive multiplexed video game server 68 in the illustrative embodiment can start two different execution sessions so each user can play the game simultaneously. If the remote users indicate a desire to play against one another, the exemplary interactive multiplexed video game server 68 can support head-to-head remote game play, i.e., multiple remote users at different remote locations (e.g., users at different hotels, users in different rooms of the same hotel, users in different cabins of a cruise ship, users at different game playing stations of an arcade or coffee house, etc.) can control the same game and play against one other or otherwise participate in the same video game play experience.

Figure 2:
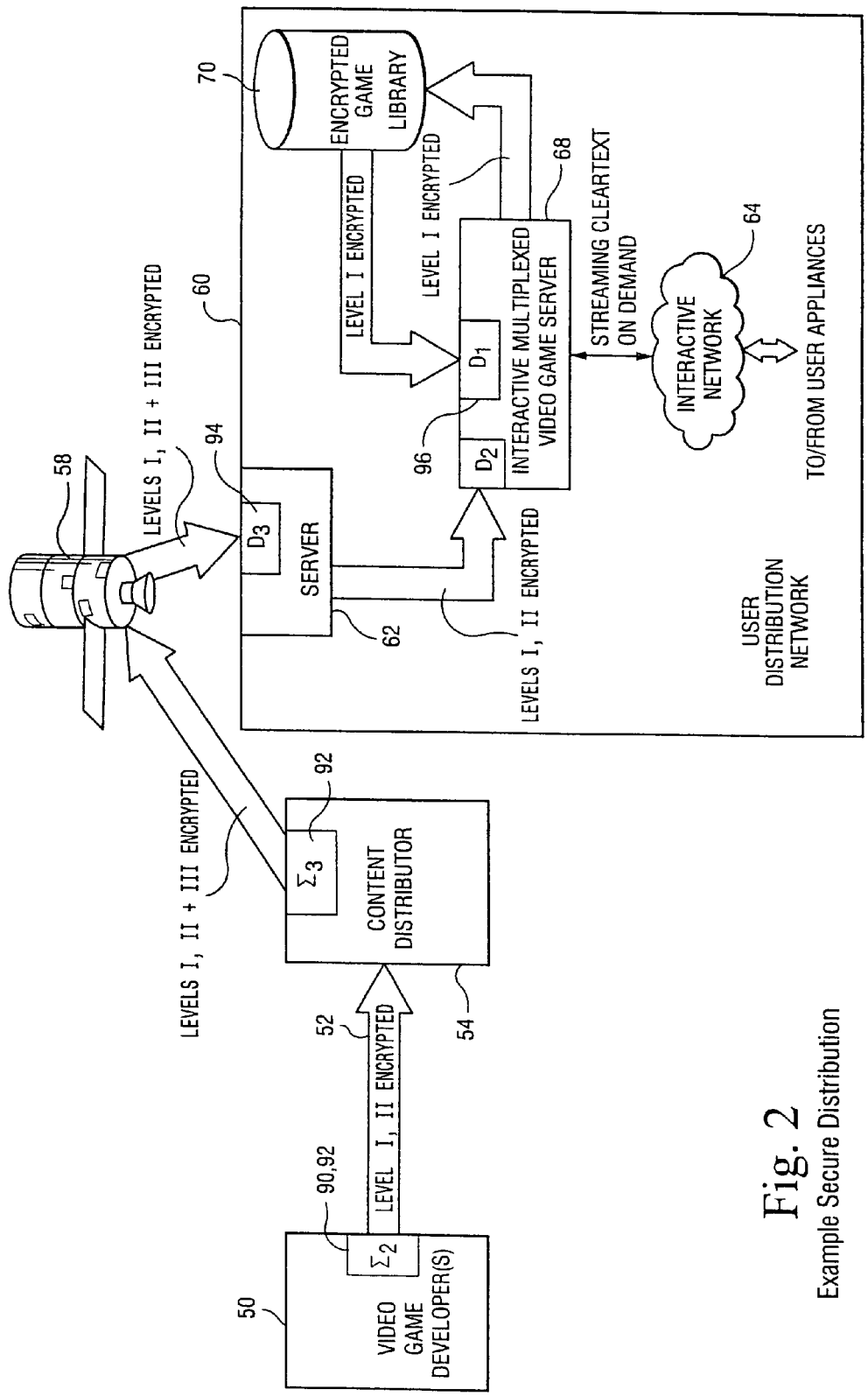
FIG. 2 shows an example illustrative secure distribution system using multi-level encryption.

FIG. 2 shows an exemplary illustrative technique for securely distributing video games 52 within the FIG. 1 network topography. This exemplary secure distribution provides end-to-end encryption of video games 52 to minimize piracy and unauthorized copying and distribution. In the example shown, video games 52 are encrypted before transmission using first and second levels of encryption $\Sigma_1, \Sigma_2$ (90, 92). The first level of encryption $\Sigma_1$ (90) may be any convenient efficient encryption for use in encrypting large amounts of data such as, for example, the Data Encryption Standard (DES) or any other conventional encryption technique. This second level of encryption $\Sigma_2$ (92) may be any conventional encryption such as, for example, double-DES. The content distributor 54 may provide even further encryption layers and other secure protocols for transmission over wide area content distribution network 58.

At the user distribution network 60 side, the user distribution network 60 partially decrypts the encrypted data stream provided over wide area content distribution network 58 by reversing the $\Sigma_2$ second-level encryption (92) with a second-level decryption $D_2$ (94). The resulting decrypted data stream is still encrypted by the first-level encryption $\Sigma_1$ so it is not in clear text. This still-encrypted data stream 52' is stored in encrypted form into encrypted game library 70. In the exemplary embodiment, this first-level encryption $\Sigma_1$ is removed only dynamically, i.e., interactive multiplexed video game server 68 applies a first-level decryption $D_1$ (96) during video game execution without ever storing the entire video game in decrypted form. Since the video game remains encrypted while stored on the illustrative encrypted game library 70 and is not, in the illustrative example, stored in its entirety in clear text form, access to the encrypted game library will not assist a pirate. Someone desiring to break the security and make an unauthorized copy of a video game would need to have access to the internal operation of the interactive multiplexed video game server 68 and, in particular, to the particular decryption keys and other information that the decryption $D_2$ process 96 uses to decrypt encrypted video games stored with library 70. The decryption elements within interactive multiplexed video game server 60 may be stored in tamper resistant hardware provided with tamper-resistant protection such as for example erasure of keys when tampering occurs.

The second level of encryption is removed before the video game is stored in the encrypted video game library 70 in the exemplary embodiment in order to save processing resources during execution by interactive multiplexed video game server 68.

Figure 3:
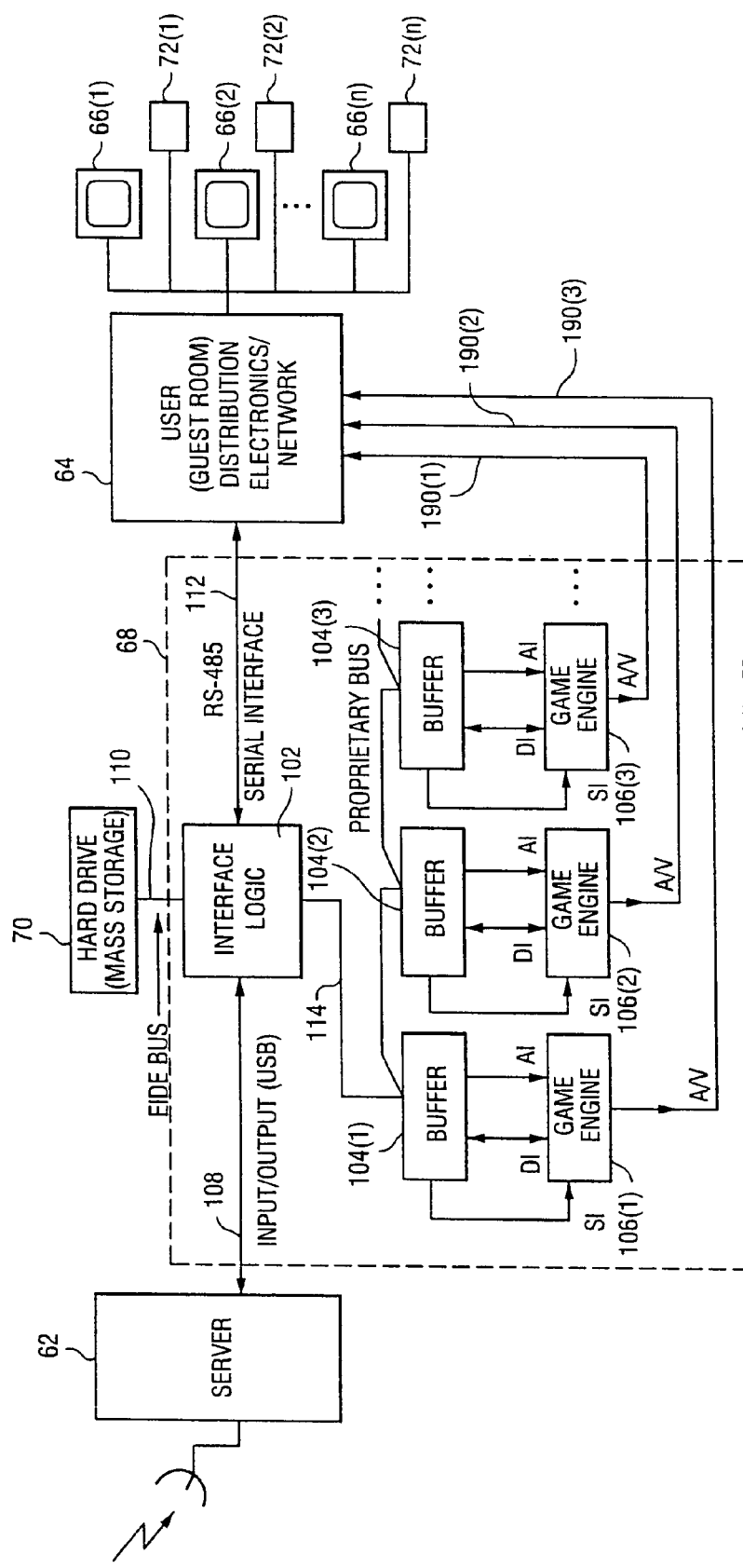
FIG. 3 shows an example illustrative user distribution network.

FIG. 3 is a block diagram of an exemplary illustrative user distribution network 60. In the exemplary embodiment shown, the interactive multiplexed video server 68 includes interface logic 102, a plurality of buffers 104 and a plurality of game engines 106. Interface logic 102 provides interfacing between the interactive multiplexed video game server 68 and content server 62, library 70 and interactive content distribution network 64. In one exemplary embodiment, for example, the interface logic 102 communicates with the content server 62 via a conventional USB, SCSI or other high speed input/output bus 108; it communicates with the library 70 (which may be conventional high capacity magnetic disk storage device) via a convention EIDE bus 110; and it communicates with input devices 72 attached to the interactive content distribution network 64 via a conventional serial interface bus 112 such as RS485 or other conventional standard. In addition, the interface logic 102 communicates with the various buffers 104 and game engines 106 via a secure data bus 114 in the preferred exemplary embodiment.

In the exemplary embodiment shown in FIG. 3, each game engine 106 can execute an independent video game session. In the preferred embodiment, game engines 106 may comprise modified conventional home video game players such as Nintendo GameCube Systems sold by Nintendo. Of course, in other embodiments, game engines 106 could comprise any other video game playing platforms (e.g., Sony PS2, Microsoft XBOX, PCS, high speed computers emulating video game platforms, etc.). Nintendo GameCube Systems (and other home video game platforms) typically execute video games from proprietary optical disks. In the preferred exemplary embodiment shown, buffers 104 are provided in place of optical disk drives typically found within the video game system. The game engine 106 audio and video outputs 190a, 190v are applied to the user distribution network 64 via appropriate frequency converters if necessary so they can be distributed to the appropriate user or users and displayed and otherwise reproduced on user appliances 66.

In the exemplary arrangement shown, each hard drive 70 and interface logic 102 supports multiple game engines 106 and associated buffers 104. For example, in one particular arrangement, each hard drive 70 and interface logic 102 can support three to five game engines 106 and associated buffers 104. The interface logic 102 multiplexes access to hard drive 70 among plural (e.g., 3-5) game engines 106 and associated buffers 104. The exact number of game engines 106 that can be multiplexed from a single hard drive 70 depends upon the hard drive access speed among other factors. Costs are minimized by sharing a hard drive 70 among multiple game engines 106 in the example embodiment. Any number of such servers 68 shown in FIG. 3 can be provided at a particular installation site to provide multiple hard drives 70 each supporting plural game engines 106 and associated buffers 104 via interface logic 102. In the preferred exemplary embodiment, it is possible to download new games into the disk 70 while game players access that same disc to play games without interruption.

In the illustrative embodiment, hard drive 70 stores a video game library comprising a number of different video games. The hard drive 70 may be formatted into blocks (e.g., 1.5 GB each in one particular implementation). Each block may store a different game. The games are encrypted in the preferred exemplary embodiment such that addressability is preserved—i.e., when the game engine 106 requests code beginning at a particular optical disk address, it is possible to map that optical disk address to a particular code stored on hard drive 70. The addressing is accomplished in the illustrative embodiment by offsetting the hard drive accesses based on block number corresponding to the particular game being played.

In one such exemplary arrangement, components are modularized by including interface logic 102 in the form of a printed circuit board within the same package as a conventional plug-in magnetic hard drive 70. The game engines 106 may similarly be modified to each include a buffer 104 in the form of an additional printed circuit board installed within the video game hardware in place of an optical disk drive. Bus 114 may be a set of cables or wiring on a back plane with fast-release connectors that interconnect plug-in hard drive/interface logic modules with associated integrated game engine 106/buffer 104 modules. This arrangement permits fast swap-in and swap-out of modules by untrained personnel. Since the data on hard drives 70 is encrypted and the hard drives may also be password-protected using conventional disk password protection, theft of such modules does not present a security problem. Dynamic changing of the disk passwords can be used to provide additional security. Attempts to unlock the disk 70 using the master password may result in erasure of all information stored on the disk.

Figure 4:
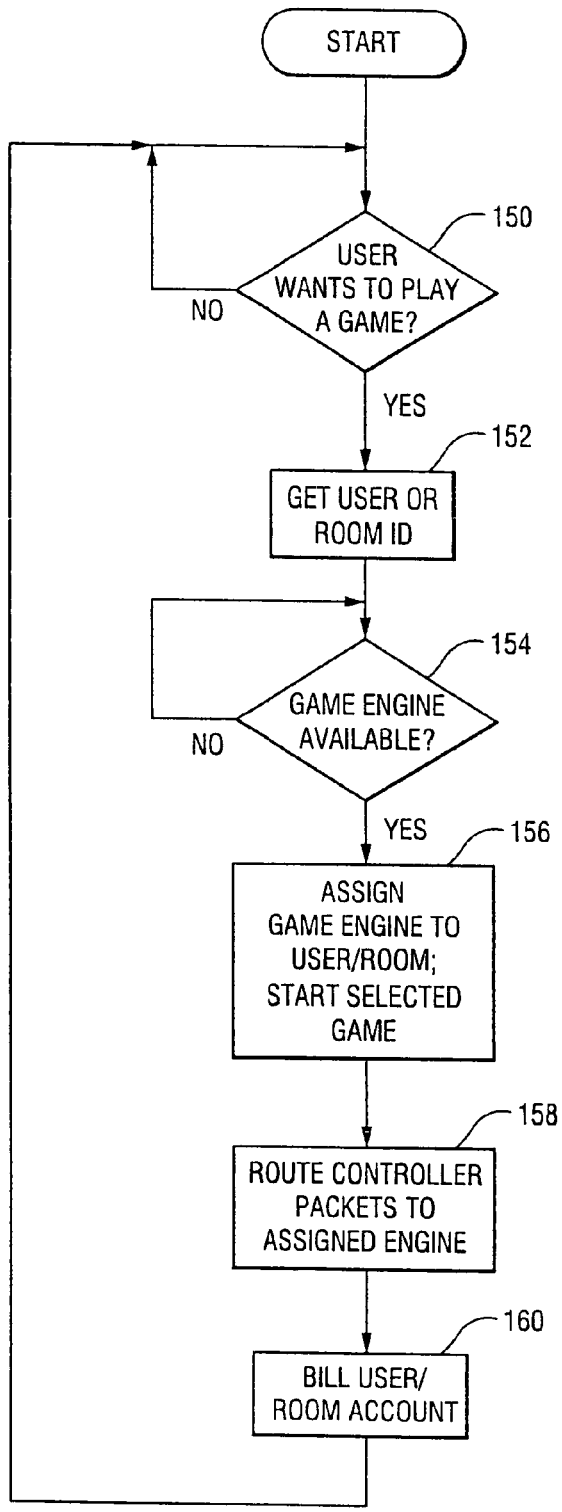
FIG. 4 shows an example illustrative game engine assignment protocol.

In the exemplary arrangement shown in FIG. 3, each game engine 106 is time-shared among all users within the user distribution network 60. More specifically, the user distribution network 60 may include any number of users only some of whom wish to play video games at any particular time. When a particular user notifies content server 62 that he or she wishes to play a video game (see FIG. 4 flowchart, block 150), the content server retrieves the user identification from the request (FIG. 4, block 152) and then determines whether there is any game engine 106 not currently in use (FIG. 4, block 154). If a game engine 106 is available, the content server 62 temporarily assigns that available game engine to that particular user (FIG. 4, block 156) and sets up a routing that will route inputs from that user's input device 72 to that particular game engine 106 via interface logic 102 (FIG. 4, block 158). Depending upon the particular business arrangement involved, the content server 62 may also log billing information to permit the user to be billed on a per-use, minute, hourly or other basis (block 160). The FIG. 4 flowchart may, if desired, include additional capabilities to establish head-to-head video game play so that multiple remote users can play the same video game against one another.

Figure 5:
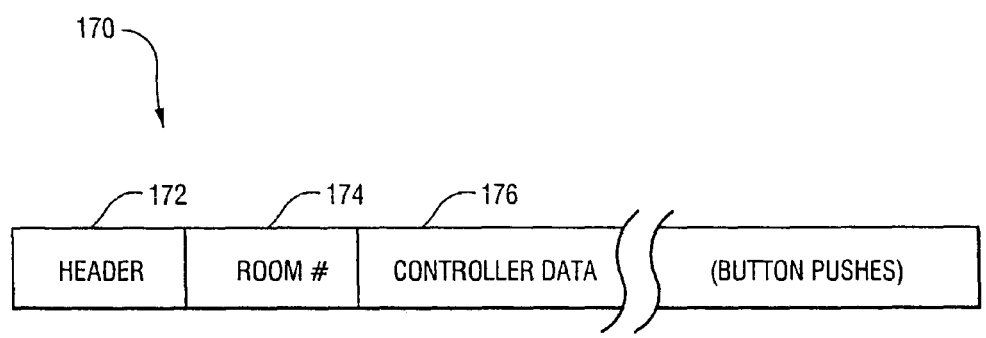
FIG. 5 shows an example illustrative handheld controller serial data packet.

FIG. 5 shows an example controller serial data packet format that input devices 72 may use to provide control inputs to game engines 106. As shown in FIG. 5, each depression of a control on input device 72 may generate a data packet 170 of a form including a header 172, a room number or other user identifier 174, and a controller data payload section 176 including encoded data indicating the status of each one of the controls of the input device. The room number or other user identifier 174 is, as discussed above, used by server 62 for billing and other purposes and is also used by interface logic 102 for routing incoming serial data packets to an appropriate assigned buffer 104 and associated game engine 106 so that the correct user's (users') inputs are routed to the correct game engine 106. As discussed above, serial data packets originating from multiple users may be routed to the same game engine 106 in the case of multi-player gaming. Such multiple users can be in the same or different locations. Server 62 in one embodiment may provide a matchmaking service for different users interested in finding gaming partners to play against.

Figure 6:
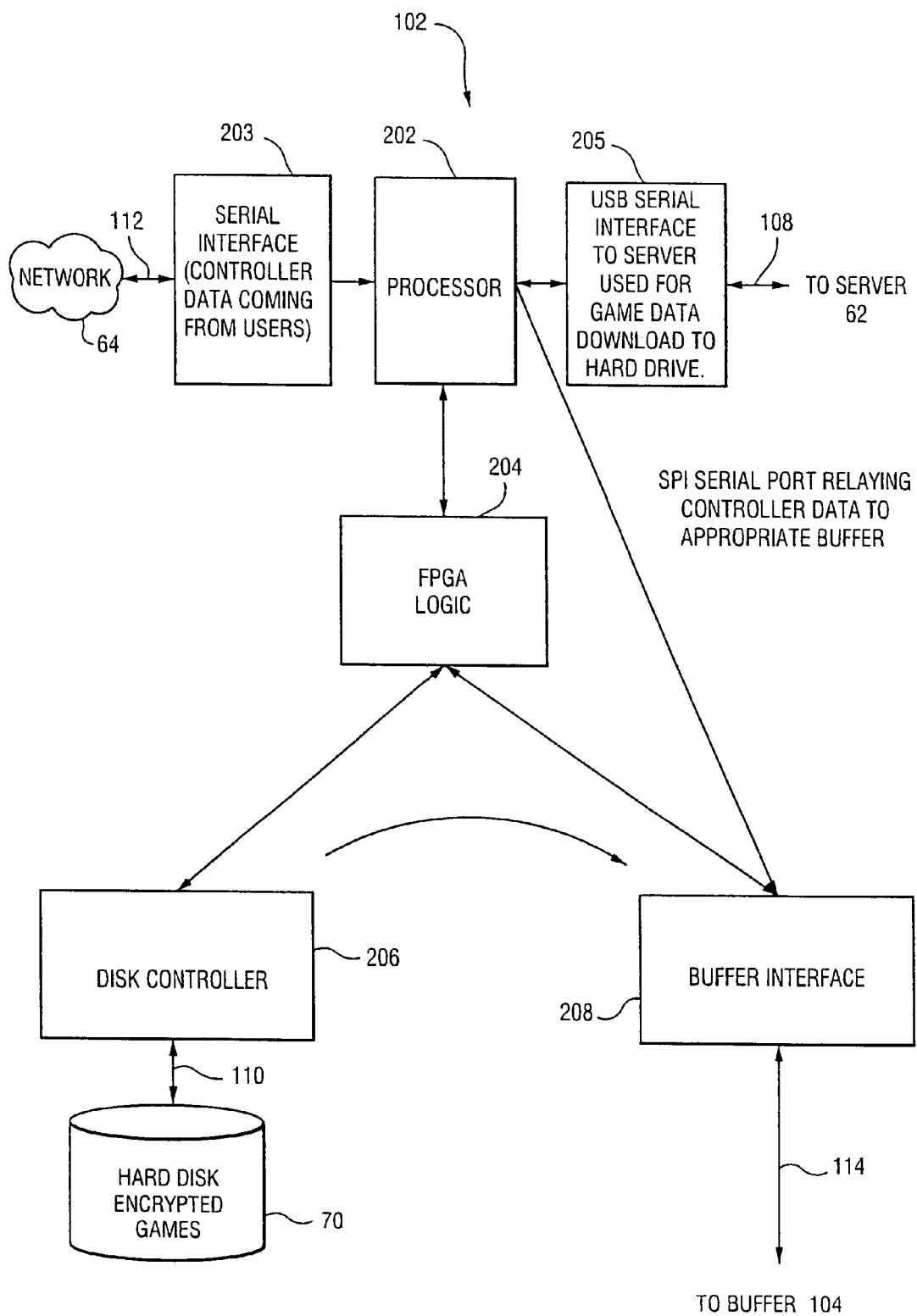
FIG. 6 shows an example illustrative interface data flow diagram.

FIG. 6 shows an example data routing diagram for routing data within the exemplary illustrative interactive multiplexed video game server 68. More specifically, FIG. 6 shows interface logic 102 as including two main components: a processor 202, and a field programmable gate array 204. The processor 202 may include an internal or external serial interface (e.g., RS485 or other conventional serial interface) for communicating with user input devices 72, at remote user locations. In one exemplary illustrative embodiment, the data from the remote user input devices 72 flows in only one direction, i.e., data packets of the type shown in FIG. 5 flow from the user handheld controllers 72 to serial interface 203 for interpretation and processing by processor 202. In other embodiments, there could be bi-directional data flow (e.g., to provide messaging to remote users, activate handheld controller features such as rumble type vibration generators, lights, etc.). Data packets from input user devices 72 may flow first through content server 62 or they may flow through other associated electronics instead that are part of the user distribution network 64.

As also shown in FIG. 6, interface logic 102 may include a further serial interface 205 which may be internal or external to processor 202. This further serial interface 205 in the preferred exemplary embodiment uses the USB protocol but other conventional protocols (e.g., SCSI, etc.) could be used instead. This interface 205 is used by processor 202 to communicate bi-directionally with content server 62. The interface 205, for example, receives encrypted games downloaded to content server 62 via the wide area content distribution network 58 for routing through processor 202 and logic 204. This downloaded data is sent to a disk interface 206 for storage onto hard drive(s) 70. In the preferred exemplary embodiment, this same serial interface 205 is used to exchange command information and responses between the interactive multiplexed video game server 68 and the content server 62. Such command information and responses may include, for example, a command to allocate a particular game engine 106 to a particular user or users, status indicator, a command to shut down a game engine, etc.

In the preferred exemplary embodiment, both processor 202 and logic 204 are coupled to a buffer interface 112. The buffer interface 112 in turn communicates over bus 114 with buffers 104. Logic 204 reads data stored on hard disk 206 in a multiplexed fashion and supplies it to the buffer interface 208 for applying to buffers 104 and game engines 106. This logic 204 in cooperation with processor 202 prioritizes scheduling and routing of hard disk 70 data to appropriate buffers 104 and game engines 106. In the exemplary embodiment, the hard disk 70, disk controller 206, logic 204 and buffer interface 208 along with buffer 104 simulates an optical disk drive from the standpoint of game engine 106. Because the access time of hard disk 70 in the exemplary embodiment is many times faster than typical optical disk drive access times, logic 204 is able to effectively multiplex or share the hard disk 70 among multiple game engines 106.

Each game engine 106 generates signals that would be normally used to access an optical disk, and the buffer 104 and buffer interface 208 in conjunction with logic 204 converts these access requests into access signals that can be used to access hard disk 70 via disk controller 206. In the exemplary embodiment, data from hard disk 70 need not flow through processor 202 but can be provided directly to buffer interface 208 via logic 204 in order to speed access times and avoid bottlenecks. However, processor 202 is also able to interact with game engines 106 via buffer interface 208 and buffers 104 in order to, for example, provide commands such as reset, execute, halt and the like as well as for reading game play status. Additionally, the processor 202 provides appropriate user controller inputs to the buffer interface 208 to allow the user to interact with an assigned game engine 106 during active game play.

Figure 7:
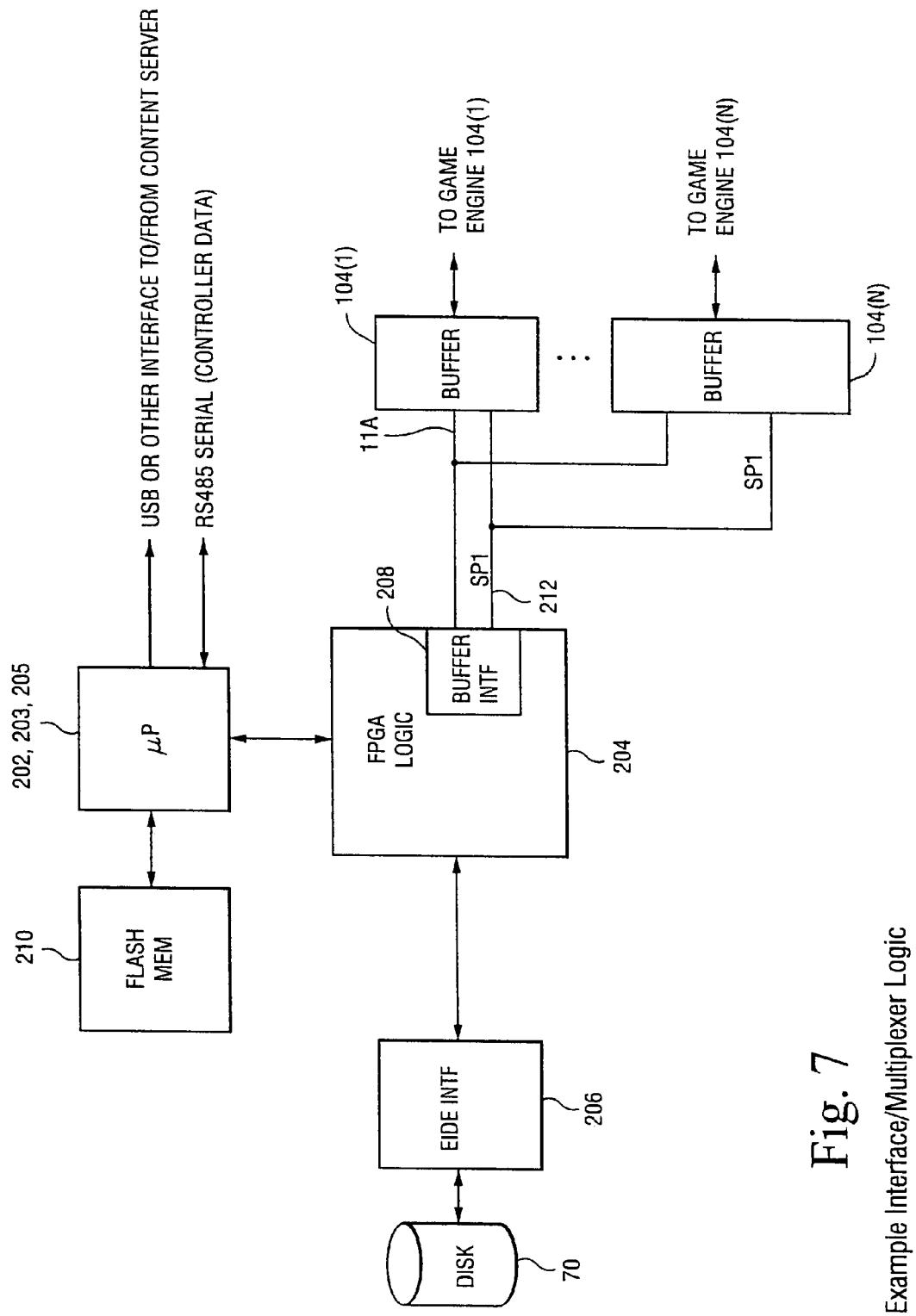
FIG. 7 shows an example illustrative interface block diagram.

FIG. 7 shows one exemplary illustrative implementation of the FIG. 6 interface logic 102. In this exemplary implementation, microprocessor 202 executes a program stored in a flash memory 210. Processor 202 in the exemplary arrangement includes an internal integral USB interface 205 and internal integral RS485 serial interface 203. Processor 202 in the illustrative embodiment continually polls the buffers 104 to determine whether any of the buffers are requesting data and if so which kind (i.e., streaming audio data or video game instructions). When a request is received, processor 202 formulates a request for data from hard drive 70, performing appropriate data address offset calculations to determine where the data is stored on the hard disk. The processor 202 then programs a direct memory access controller within interface logic 102 to actually perform the requested data transfer.

In the example shown, buffer interface 208 is actually part of the field programmable gate array logic 204 and communicates with buffers 104(1), 104(N) via a serial "Joy Bus" 212 of the type used in conventional Nintendo GameCube System and other products for communication between handheld controllers and video game platforms. Processor 202 interprets controller data received from user input devices 72 and creates appropriate corresponding joybus data compatible with game engines 106 for the buffer interface to transmit to buffers 104 over bus 116. In addition, bus 114 is used to communicate executable instructions and audio and video digital data to the buffers 104 for consumption by game engines 106.

An example illustrative power-on sequence performed by processor 202 is as follows:
configure field-programmable gate array logic 204 based on contents of flash memory 210;
initialize disk interface 206 and verify self-test results;
initialize disk drive 70 via interface 206, including setting security mode and password (which may be changed randomly at each power-on);
interrogate buffers 104 via serial (SPI) bus 212 to determine how many game engines 106 are active and connected;
send configuration data to buffers 104 via serial (SPI) bus 212;

loop and wait for game start or update game data command.

Upon receiving a "game start" command from server 62 (which game start command may include a game engine 106 identifier and a disk-offset value corresponding to the requested game on hard drive 70), processor 202 may send a "game start" command and offset to the appropriate buffer 104 via bus 116. Cost or charge logging may also occur on server 62 or otherwise to allow users to be charged on a per-play basis.

Figure 8:
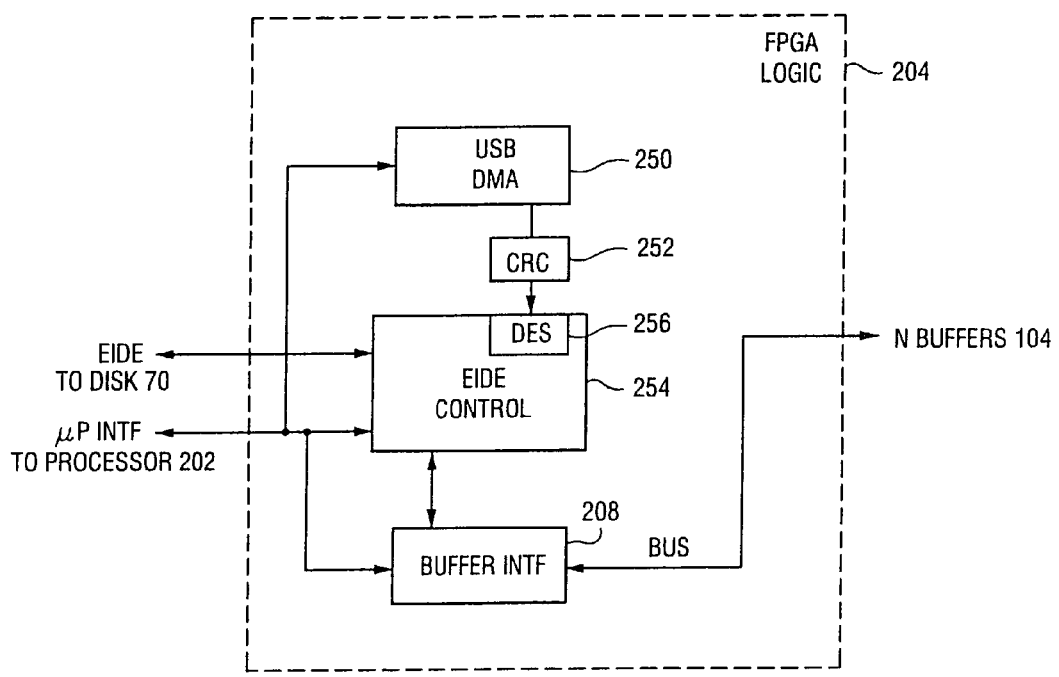
FIG. 8 shows an example illustrative interface logic block diagram.

FIG. 8 shows an example implementation of field programmable logic 204 shown in FIG. 7. In this example, field programmable game array logic 204 includes a DMA channel 250, an error checking component 252, a disk interface control block 254 and a buffer interface 208. In this particular example, high speed data such as game downloads received from processor 202 via the serial interface 108 are routed to a USB Direct Memory Access channel 250 for data transfer handling. The Direct Memory Access (DMA) channel 250 receives this data and directs it appropriately using conventional direct memory access techniques. An error checking block 252 (e.g., CRC) uses conventional error checking techniques to detect and correct transmission errors.

In the exemplary embodiment, downloaded game data is routed by a disk control block 254 to disk 70. In one exemplary embodiment, during this routing process a DES or other decryption block 256 within disk control block 154 strips off two layers out of the 3-layer DES encryption, leaving the data 1DES encrypted for storage onto disk 70. Such decryption may be based on a predetermined decryption key stored in a tamper-resistant fashion. The data stored on the disk 70 in the exemplary embodiment is still encrypted by a further encryption layer (e.g., DES or other encryption) so it is stored securely on the hard disk During reads from disk 70 at the request of game engines 106 and associated buffers 104, read requests provided by the buffers over bus 114 are received by the buffer interface 208 and provided to disk control block 254. In this exemplary arrangement, the disk control block 254 decryption element 256 may dynamically decrypt the data during disk reads to remove the last layer of encryption so that clear, executable game instructions and other information can be provided via buffer interface 208 to the appropriate buffer 104 and associated game engine 106. In another exemplary arrangement, bus 114 may also carry encrypted information, and the decryption function can be performed instead by buffers 104. This latter arrangement provides additional security against attacks based on probing bus 114.

Figure 9:
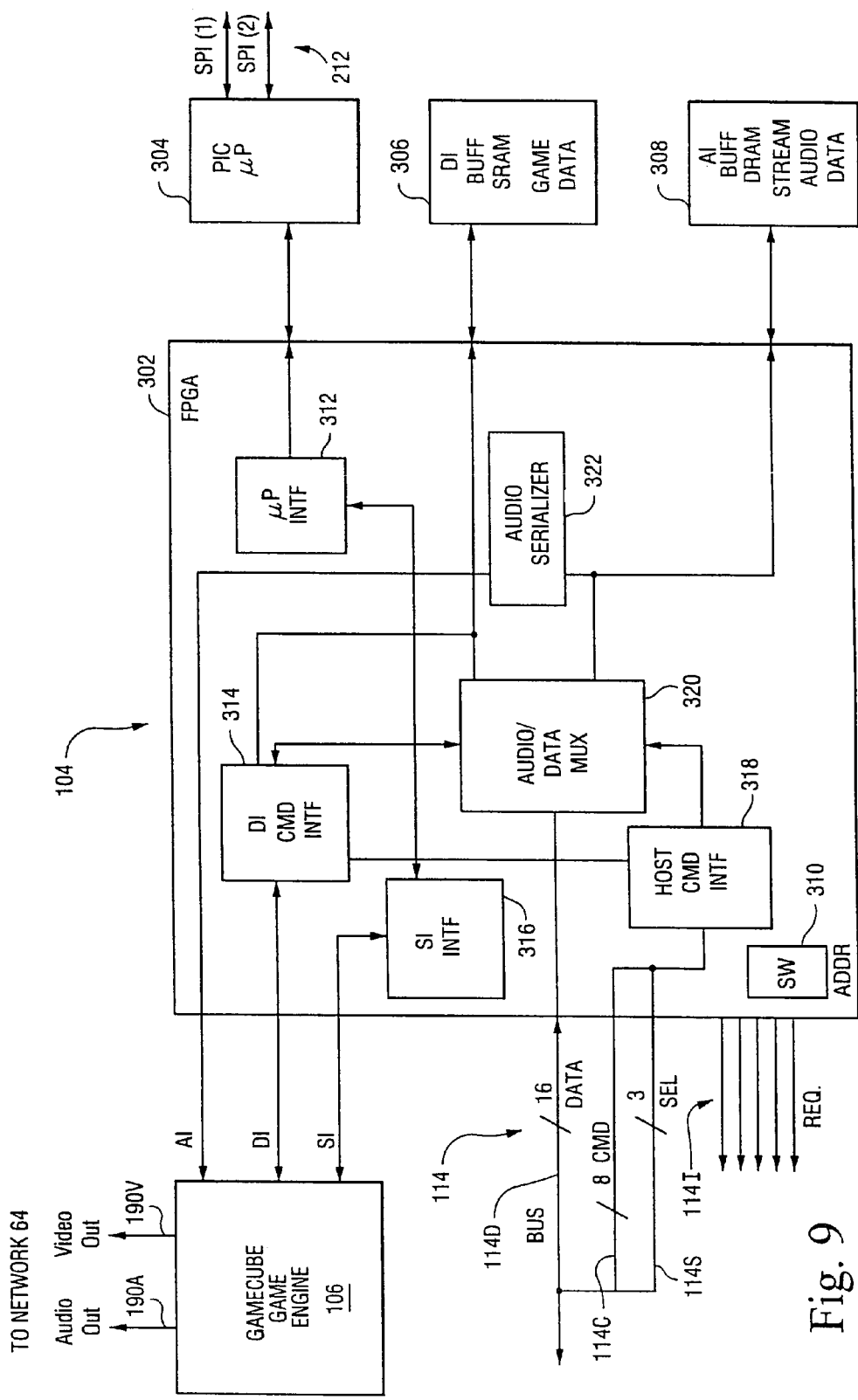
FIG. 9 shows an example illustrative buffer block diagram.

FIG. 9 shows an exemplary implementation for a buffer 104. In this exemplary arrangement, the illustrative buffer 104 includes a field programmable gate array 302 and a microprocessor 304. The microprocessor 304 receives and processes the user handheld controller inputs received over a two-bit serial bus 212 as described above, and also programs and resets the field programmable gate array 302 upon power-up. Microprocessor 304 can also send status and buffer 104 identification information to interface 102. The field programmable gate array 302 manages data buffers and also interacts with game engine 106.

In more detail, the programmable gate array 302 temporarily stores game data within a data buffer 306 (e.g., a 512K SRAM or other appropriately sized read/write memory device) and may also temporarily store audio data in a streaming audio data buffer 308 (e.g., an 8 megabyte or other appropriately sized DRAM or other read/write memory storage device). These game data and streaming audio data buffers 306, 308 are used in the preferred exemplary embodiment to temporarily buffer data that has been requested by game engine 106 for delivery to the game engine. The buffering function ensures that the game engine 106 will always have the data it requires at the time it requires it even though there may be latency on bus 114, i.e., the data arrives soon enough. Buffer 306 may buffer only as much data and instructions that the game engine 106 has requested in its last command or other request (e.g., to avoid speed performance disparities vis-à-vis consumer hardware playing the same game). The larger audio data buffer 308 is used to buffer a relatively high bandwidth of streaming audio data for consumption by game engine 106. Audio streaming is treated in the exemplary embodiment as a background priority task, with the audio data buffer 308 maintaining for example 3 seconds of audio data based on a game engine 106 audio data rate of 192 Kbytes/second (different applications may have different requirements). In the exemplary embodiment, audio buffering may be interrupt-driven and may take precedence over data/instruction buffering since audio interruption is typically very noticeable to end users.

In the exemplary embodiment, bus 114 that interface logic 102 uses to communicate with buffers 104 may include a 16-bit data path 114d, an 8-bit command path 114C and a 3-bit select path 114S. The select path 114S may be used to address different buffers 104. The buffer FPGA may include a DIP or other switch 310 to "hard-wire" an address matching addresses provided over the buffer select bus 114S (alternative addressing techniques are also possible). This 3-bit address in the exemplary embodiment is used to "bind" a particular buffer 104 to interface logic 102 with respect to a particular user room number or other identifier so as to temporarily assign the buffer 104 to a particular user for a particular game playing session. Once that user finishes playing video games, the server 68 releases the buffer 104 and associated game engine 106 for use by another user. In one example embodiment, "game save" data generated during game play can be stored on server 62 at the conclusion of game play so the user can retrieve and use it later during subsequent game play (which, in general, will occur on a different game engine 106).

Commands are exchanged between interface logic 102 and buffers 104 via the command bus 114C, and data is exchanged between interface logic 102 and buffers 104 via the data bus 114D. Bus 114 may further include interrupt request lines 114I that buffers 104 may use to interrupt the interface microprocessor 202 or other components (in the exemplary embodiment, a buffer 104 will use a particular interrupt request line based on its hardwired address to the interface logic 102 can tell immediately which buffer has generated the interrupt). The buffers 104 can use these interrupts to signal the interface logic 102 in response, for example, to the need to service a request from the game engine 106 for an additional read from disk 70. As will be understood, these bus sizes and configurations are only exemplary—different requirements may dictate different data path configurations and/or widths.

As shown in FIG. 9, the buffer FPGA 302 includes a microprocessor interface 312, a disk (DI) interface 314, a serial interface 316, a host command interface 318, an audio/data multiplexer 320, and an audio serializer 322. The disk (DI) interface 314 is used to interface with the game engine 106 optical disk interface. Briefly, the DI interface 314 receives game engine 106 access requests intended for an optical disk, and converts them into appropriate intermediate commands for providing to interface logic 102 via the command interface 318 and bus 114. The DI interface 314 thus acts as part of an optical disk emulator by translating game engine optical disk access commands into what will eventually become hard disk drive access commands for accessing data stored on a remote hard drive 70. Even though the illustrative magnetic hard drive is capable of responding to read requests many times faster than the "normal" conventional optical disk drives typically associated with video game player engines, the preferred exemplary embodiment optical disk emulation is performed by duplicating, as closely as possible, the timing that a typical video game engine optical disk drive would exhibit in response to read requests. Host command interface 318 may provide appropriate hard disk offset information (as well as command handling) based on information it receives from the interface 102. Data received from such hard drive 70 accesses are provided to the audio/data multiplexer 320 which routes data and instructions to the DI interface 314 for providing to the game engine 106 in response to optical disk access commands. DI interface 314 also handles other types of optical disk interface interaction with the game engine 106 to make it appear to the game engine 106 that it is actually communicating with a real, local optical disk drive. In other embodiments, game engines 106 are designed for magnetic disk access and interface 314 manages such accesses so they can be made remotely rather than locally.

In one exemplary illustrative embodiment, game engine 106 is designed to receive separate audio streaming data from an optical disk via an AI path. Audio/data multiplexer 320 buffers incoming streaming audio digital data in parallel format within the audio data buffer 308. It also decides whether required data is already within the audio buffer 308 or whether an interrupt request for more data needs to be generated. Serializer 322 is used in the exemplary embodiment to appropriately serialize parallel-format audio data for presentation to game engine 106 audio input (AI) as a serial audio bit stream. Serializer 322 and audio data buffer 308 thus emulates the streaming audio data portion of an exemplary optical disk in the illustrative embodiment.

The serial interface 316 is used to interface with the game engine 106 "joy bus" serial interface. Serial interface 316, microprocessor interface 312 and microprocessor 304 work together to provide appropriate remote user inputs to the game engine 106 to allow the remote user(s) to interact with the game play being generated by the game engine.

While the invention has been described in connection with what is presently considered to be the most practical and preferred embodiment. For example, while the illustrative embodiments have generally been described in connection with personal video game play, the arrangements could be used in video game arcades, for in-store video game displays, and for other applications. It is to be understood that the invention is not to be limited to the disclosed embodiment, but on the contrary, is intended to modifications and equivalent arrangements included within the scope of the appended claims.

The invention claimed is:

1. An entertainment system, comprising:
an electronic game library including plural games stored on a mass storage device;
multiple game engines coupled to an interactive distribution network to which multiple user devices may also be coupled, each user device remotely located from the electronic game library and the multiple game engines; and
a controller configured to receive a game selection from one of the user devices via the interactive distribution network and to assign one of the game engines to execute a game from the game library selected by the one user device, wherein the assigned game engine is configured (a) not to receive the entire selected game but only a portion of game program code just before the assigned game engine requires that portion to continue with game play, (b) to provide game play signals corresponding to the received game portion to the one user device over the interactive distribution network, and (c) to receive game player control signals from the one user device in response to the provided game play signals over the interactive distribution network with sufficient speed to permit the one user to play the selected game substantially in real time, wherein the game when executed displays a virtual environment that includes an in-game character whose movement in the virtual environment is controlled by game play inputs from a user playing the game, each received portion of game program instruction code being determined based on one or more of the game play inputs directing movement of the in-game character to a particular location in the virtual environment, wherein the assigned game engine is configured to provide head-to-head play between multiple user devices at remote locations so that users of those user devices can control the same game and play against one another or otherwise participate in the same game play experience substantially in real time, wherein the assigned game engine is configured to provide the head-to-head play between users at remote locations by providing the same game play signals corresponding to the received game portion over the interactive distribution network to each of the user devices involved in the head-to-head play so that the users can control the same game and play against one another substantially in real time or otherwise participate in the same game play experience substantially in real time.

2. The entertainment system in claim 1, wherein the controller and the game engines are located at a head-end of the interactive distribution network.

3. The entertainment system in claim 2, wherein the head-end includes a cable television head-end that also distributes television content to cable television subscribers and the interactive distribution network includes a cable television distribution network.

4. The entertainment system in claim 1, wherein the interactive distribution network includes the Internet, a fiber optic network, or digital subscriber links (DSL).

5. The entertainment system in claim 1, wherein the controller includes a content server configured to receive a game update or a new game and to store the game update or the new game in the electronic game library in the mass storage device.

6. The entertainment system in claim 5, wherein the content server is capable of storing the game update or the new game in the game library of the mass storage device at the same time that the assigned game engine is accessing a portion of the selected game stored in the game library without interrupting the one user's game play.

7. The entertainment system in claim 5, wherein the game engines are part of an interactive multiplexed game server configured to provide plural, substantially real time, parallel game execution sessions for different users.

8. The entertainment system in claim 7, wherein the interactive multiplexed game server is configured to provide plural, substantially real time, parallel game execution sessions of different games.

9. The entertainment system in claim 7, wherein the interactive multiplexed game server is configured to provide plural, substantially real time, parallel game execution sessions of the same game.

10. The entertainment system in claim 7, wherein the interactive multiplexed game server includes:
   interface logic coupled to the content server and the mass storage device; and
   plural buffers, coupled to the interface logic, for storing audio and video information retrieved from a selected game in the game library,
   wherein each game engine is configured to request and receive from a corresponding buffer audio and video information used to provide game play signals to a user device via the interactive distribution network.

11. The entertainment system in claim 10, wherein the game engines are modified conventional home video game players.

12. The entertainment system in claim 10, wherein the interactive game server includes a processor for polling plural game engines currently executing game instructions for requests to transfer additional game program instructions and scheduling transfer of additional game program instructions during different time intervals for different ones of said plural game engines in response to said requests.

13. The entertainment system in claim 10, wherein each corresponding buffer can only store a portion of code for an associated game program.

14. The entertainment system in claim 1, wherein the accessed portion of the selected game includes sufficient game play information to permit interactive, substantially real time game play at the one user device.

15. The entertainment system in claim 1, wherein the controller is configured to provide a matchmaking service for different users interested in finding gaming partners to play against.

16. The entertainment system in claim 1, wherein the selected game stored in the game library is encrypted, and the assigned game engine is configured to at least partially decrypt the encrypted selected game and provide substantially real time interactive game play to the user via the interactive distribution network.

17. The entertainment system in claim 1, wherein the controller is configured to save game play data resulting from the user's game play to permit retrieval by the user for subsequent game play.

18. The entertainment system in claim 1, wherein the one user device includes a personal computer.

19. The entertainment system in claim 18, wherein the interactive distribution network includes a cable television distribution network and the one user device includes a cable television set top box, a handheld game controller for generating game play control signals during game play communicated to the game engine via the cable television set top box and the interactive distribution network, and a television-related controller for selecting a game for play communicated to the controller via the cable television set top box and the interactive distribution network.

20. The entertainment system in claim 18, wherein user input data is formatted in data packets, each packet including a header, a user identifier, and controller data, and wherein the user identifier is used to route packets to the assigned game engine.

21. The entertainment system in claim 20, wherein packets from different users playing a multi-player game may be routed to the same game engine.

22. The entertainment system in claim 20, wherein the interactive distribution network includes a cable television distribution network and the one user device includes a cable television set top box, a handheld game controller for generating control signals during game play communicated to the game engine via the cable television set top box and the interactive distribution network, and wherein the cable television set top box is configured to packetize the handheld game controller control signals and transmit resulting packets over the cable television distribution network back to the controller or to the assigned game engine.

23. The entertainment system in claim 20, wherein the controller or the assigned game engine is configured to record billing information for game play using the user identifier.

24. The entertainment system in claim 1, wherein the one user device includes a display and one or more user input devices for generating game play control signals routed back to the assigned game engine over the interactive distribution network.

25. The entertainment system in claim 24, wherein the display is a television and the one or more user input devices includes a handheld game controller used to select a game for play communicated to the controller and to generate game play control signals during game play communicated to the assigned game engine via the interactive distribution network.

26. The entertainment system in claim 1, wherein the controller is configured to interleave transfers of additional portions of games corresponding to the multiple game engines while each of the multiple game engines is executing previously-transferred game portions.

27. A cable TV head-end for providing entertainment, comprising:
   a game library including plural games stored on a mass storage device;
   multiple game engines coupled to a cable TV distribution network to communicate with multiple user devices via respective cable TV interface circuitry associated with each user device, wherein the user devices are located remotely from the cable TV head-end;
   a controller configured to receive a game selection from one of the user devices via the cable TV distribution network and to assign one of the game engines to execute a game from the game library selected by the one user device,
   wherein the assigned game engine is configured (a) not to receive the entire selected game but only a portion of game program code just before the assigned game engine requires that portion to continue with game play, (b) to provide resulting game play signals to the one user device over the cable TV distribution network, and (c) to receive game player control signals from the one user device in response to the provided game play signals over the cable TV distribution network with sufficient speed to permit the one user to play the selected game substantially in real time,
   wherein the game when executed displays a virtual environment that includes an in-game character whose movement in the virtual environment is controlled by game play inputs from a user playing the game, each requested portion of game program instruction code being determined based on one or more of the game play inputs directing movement of the in-game character to a particular location in the virtual environment,
   wherein the assigned game engine is configured to provide head-to-head play over the cable TV distribution network between multiple user devices at remote locations so that users of the multiple user devices can control the same game and play against one another or otherwise participate in the same game play experience substantially in real time, wherein the assigned game engine is configured to provide the head-to-head play between the multiple user devices at remote locations by providing the same game play signals corresponding to the received game portion over the interactive distribution network to each of the multiple user devices involved in the head-to-head play so that the users can control the same game and play against one another substantially in real time or otherwise participate in the same game play experience substantially in real time.

28. The cable TV entertainment head-end in claim 27, wherein the assigned game engine is configured to distribute audio and video content from the selected game portion to the one user device via the cable TV distribution network.

29. The cable TV entertainment head-end in claim 28, wherein the audio and video content is controlled by input signals generated by the one user device delivered to the cable TV entertainment head-end via the cable TV distribution network.

30. The cable TV entertainment head-end in claim 29, wherein the audio and video content and the input signals are sent over the cable TV distribution network as packets.

31. The cable TV entertainment head-end in claim 27, wherein a received portion of the selected game includes sufficient game play information to permit interactive, substantially real time game play.

32. The cable TV entertainment head-end in claim 27, wherein the game engines are part of an interactive multiplexed game server configured to provide plural, substantially real time, parallel game execution sessions for different users.

33. The cable TV entertainment head-end in claim 32, wherein the multiplexed interactive game server is configured to provide head-to-head play between users at remote locations so that the users can control the same game and play against one another or otherwise participate in the same game play experience.

34. The cable TV network entertainment head-end in claim 27, wherein the controller is configured to poll multiple game engines currently executing game instructions for requests to transfer additional game program instructions and schedule transfer of additional game program instructions during different time intervals for different ones of said multiple game engines in response to said requests.

35. The cable TV network entertainment head-end in claim 27, wherein the controller is configured to interleave transfers of additional portions of games corresponding to the multiple game engines while each of the multiple game engines is executing previously-transferred game portions.

36. A method for a multi-user electronic game playing arrangement including an electronic game library including plural games stored on a mass storage device and multiple game engines coupled to the mass storage device and to an interactive distribution network to which multiple, remotely-located user devices may also be coupled, comprising:

receiving a game selection from one of the user devices via the interactive distribution network;

assigning one of the game engines to execute a game from the game library selected by the one user device;

receiving at the assigned game engine only a portion of game program code of the selected game stored in the electronic game library just before the assigned game engine requires that portion to continue with game play, wherein the assigned game engine does not to download the entire selected game but only a portion of the selected game as needed;

providing from the assigned game engine game play signals corresponding to the received game portion to the one user device over the interactive distribution network;

receiving at the assigned game engine game player control signals from the one user device in response to the provided game play signals over the interactive distribution network with sufficient speed to permit the one user to play the selected game substantially in real time, wherein the executed game program code displays a virtual environment that includes an in-game character whose movement in the virtual environment is controlled by game play inputs from a user playing the game, each received portion of game program code being determined based on one or more of the game play inputs directing movement of the in-game character to a particular location in the virtual environment, and providing head-to-head play between user devices at remote locations so that users of those user devices can control the same game and play against one another or otherwise participate in the same game play experience substantially in real time, wherein the assigned game engine provides the head-to-head play between users at remote locations by providing the same game play signals corresponding to the received game portion over the interactive distribution network to each of the user devices involved in the head-to-head play so that the users can control the same game and play against one another substantially in real time or otherwise participate in the same game play experience substantially in real time.

37. The method in claim 36, further comprising:

providing plural, substantially real time, parallel game execution sessions of the same game.

38. The method in claim 36, wherein the interactive distribution network is a cable TV distribution network.

* * * * *